United States Patent
Chen et al.

(10) Patent No.: US 12,508,753 B2
(45) Date of Patent: Dec. 30, 2025

(54) LIQUID INTRODUCTION APPARATUS, ADHESIVE DISPENSING APPARATUS AND LIQUID INTRODUCTION METHOD

(71) Applicant: Fulian Yuzhan Precision Technology Co., Ltd., Shenzhen (CN)

(72) Inventors: Xiao-Ping Chen, Shenzhen (CN); Shun-Fa Yan, Shenzhen (CN); Wei Gong, Shenzhen (CN); Ze-Xin Shen, Shenzhen (CN); Hua-Ping Fu, Shenzhen (CN)

(73) Assignee: Fulian Yuzhan Precision Technology Co., Ltd., Shenzhen (CN)

( * ) Notice: Subject to any disclaimer, the term of this patent is extended or adjusted under 35 U.S.C. 154(b) by 192 days.

(21) Appl. No.: 18/140,521

(22) Filed: Apr. 27, 2023

(65) Prior Publication Data

US 2023/0347560 A1 Nov. 2, 2023

(30) Foreign Application Priority Data

Apr. 29, 2022 (CN) .......................... 202210474882.X (51) Int. Cl.
*B29C 45/14* (2006.01)
*B29C 45/17* (2006.01)
*B29K 105/00* (2006.01)

(52) U.S. Cl.
CPC .......... *B29C 45/14* (2013.01); *B29C 45/1701* (2013.01); *B29K 2105/0097* (2013.01)

(58) Field of Classification Search
CPC ................ B29C 45/14; B29C 45/1701; B29K 2105/0097
See application file for complete search history.

(56) References Cited

U.S. PATENT DOCUMENTS

| | | | | |
|---|---|---|---|---|
| 6,019,918 A | * | 2/2000 | Guergov | B29C 45/1703 264/572 |
| 2012/0175815 A1 | * | 7/2012 | Aebi | B08B 15/02 425/546 |
| 2015/0336307 A1 | * | 11/2015 | Yamamoto | B29C 44/422 264/40.4 |

FOREIGN PATENT DOCUMENTS

| | | | | |
|---|---|---|---|---|
| CN | 112810068 A | * | 5/2021 | ............. B29C 45/17 |
| CN | 113021776 A | * | 6/2021 | ......... B29C 45/4225 |
| CN | 113414069 A | | 9/2021 | |
| CN | 114311753 A | | 4/2022 | |

* cited by examiner

*Primary Examiner* — JaMel M Nelson
(74) *Attorney, Agent, or Firm* — ScienBiziP, P.C.

(57) ABSTRACT

A liquid introduction apparatus for introducing liquid into a product includes a platform, a cabinet on the platform for receiving the product, a cover transfer mechanism on the platform and adjacent to the cabinet, and an introduction mechanism. The cover transfer mechanism moves a cover to seal the cabinet. The introduction mechanism includes an introduction nozzle extending through the cover, and the introduction nozzle is configured to connect to the product in the cabinet and introduce liquid into the product when the cabinet has a vacuum environment. An adhesive dispensing apparatus and a liquid introduction method are also disclosed.

15 Claims, 7 Drawing Sheets

LIQUID INTRODUCTION APPARATUS, ADHESIVE DISPENSING APPARATUS AND LIQUID INTRODUCTION METHOD

CROSS-REFERENCE TO RELATED APPLICATION

This application claims priority to China Application No. 202210474882.X, having a filing date of Apr. 29, 2022, filed in China State Intellectual Property Administration, the entire contents of which are hereby incorporate by reference. This application is also related a U.S. patent application, each entitled "LIQUID INTRODUCTION APPARATUS AND ADHESIVE DISPENSING APPARATUS", and each invented by XIAO-PING CHEN et al. These applications have the same assignee as the present application. The above-identified applications are incorporated herein by reference.

FIELD

The subject matter relates to manufacturing, and more particularly to a liquid introduction apparatus, an adhesive dispensing apparatus and a liquid introduction method.

BACKGROUND

A filling machine for glue or adhesive is generally used for filling glue or adhesive into space of products, then the glue is cured in the products by light. However, when the glue is being filled into the product by the glue filling machine, the glue flows slowly into the space of the products due to its viscosity, resulting in low production efficiency. Furthermore, air in the space within products may be easily trapped inside the glue, which brings poor filling saturation, insufficient compactness of the glue, and low yield rate of the products.

Therefore, there is room for improvement within the art.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

Figure 1:
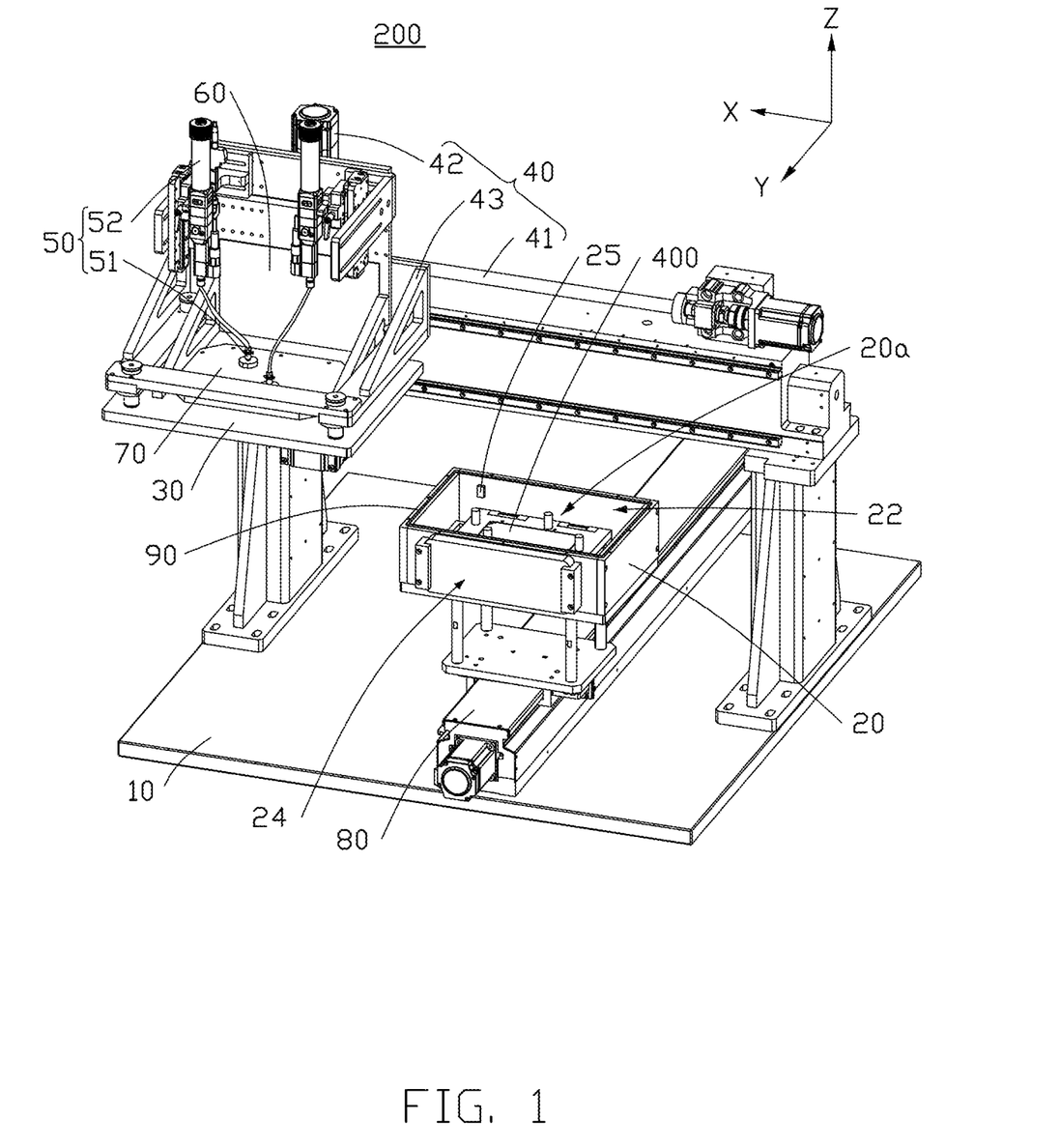
FIG. 1 is a perspective view of a liquid introduction apparatus according to a first embodiment of the present disclosure.

Referring to FIG. 1, a first embodiment of a liquid introduction apparatus 200 is provided, the liquid introduction apparatus 200 is configured for introducing liquid into a product 400, and the liquid may be stored in the product 400, further, the injected liquid may be cured in the product 400. Understandably, the product 400 may be an injection mold, the injection mold may further include a workpiece. The liquid may be a single type of glue or adhesive. Alternatively, the liquid may be a mixture of different types of glue or adhesive. When the liquid includes glue or adhesive, the liquid introduction apparatus 200 is an adhesive dispensing apparatus. According to some embodiments, the product 400 is an injection mold including a workpiece placed therein, and the liquid is introduced into the injection mold and is coated on a periphery of the workpiece. After the liquid is cured by light or heat, the liquid is directly combined with the workpiece. The workpiece may be a backlight module, or any other module that needs to be connected to a component by glue or adhesive. In at least one embodiment, the liquid may be sealing oil or any other fluid.

Referring to FIG. 1, the liquid introduction apparatus 200 includes a platform 10, a cabinet 20, a cover 30, a cover transfer mechanism 40, and an introduction mechanism 50. The cabinet 20, the cover transfer mechanism 40, and the introduction mechanism 50 are supported on platform 10.

Figure 2:
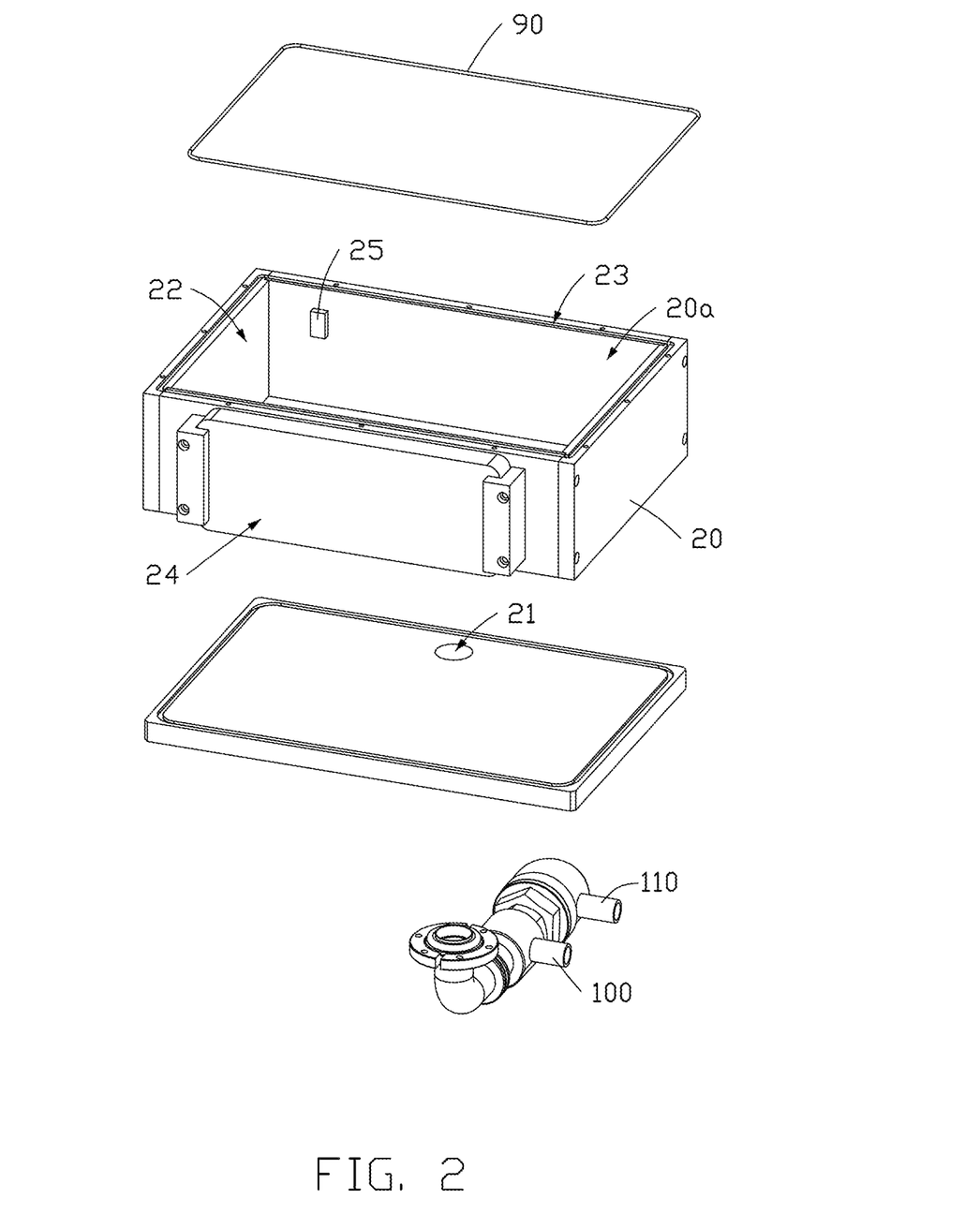
FIG. 2 is a partial exploded view of the liquid introduction apparatus in FIG. 1 showing a cabinet, a sealing element, a first valve, and a second valve.
Figure 3:
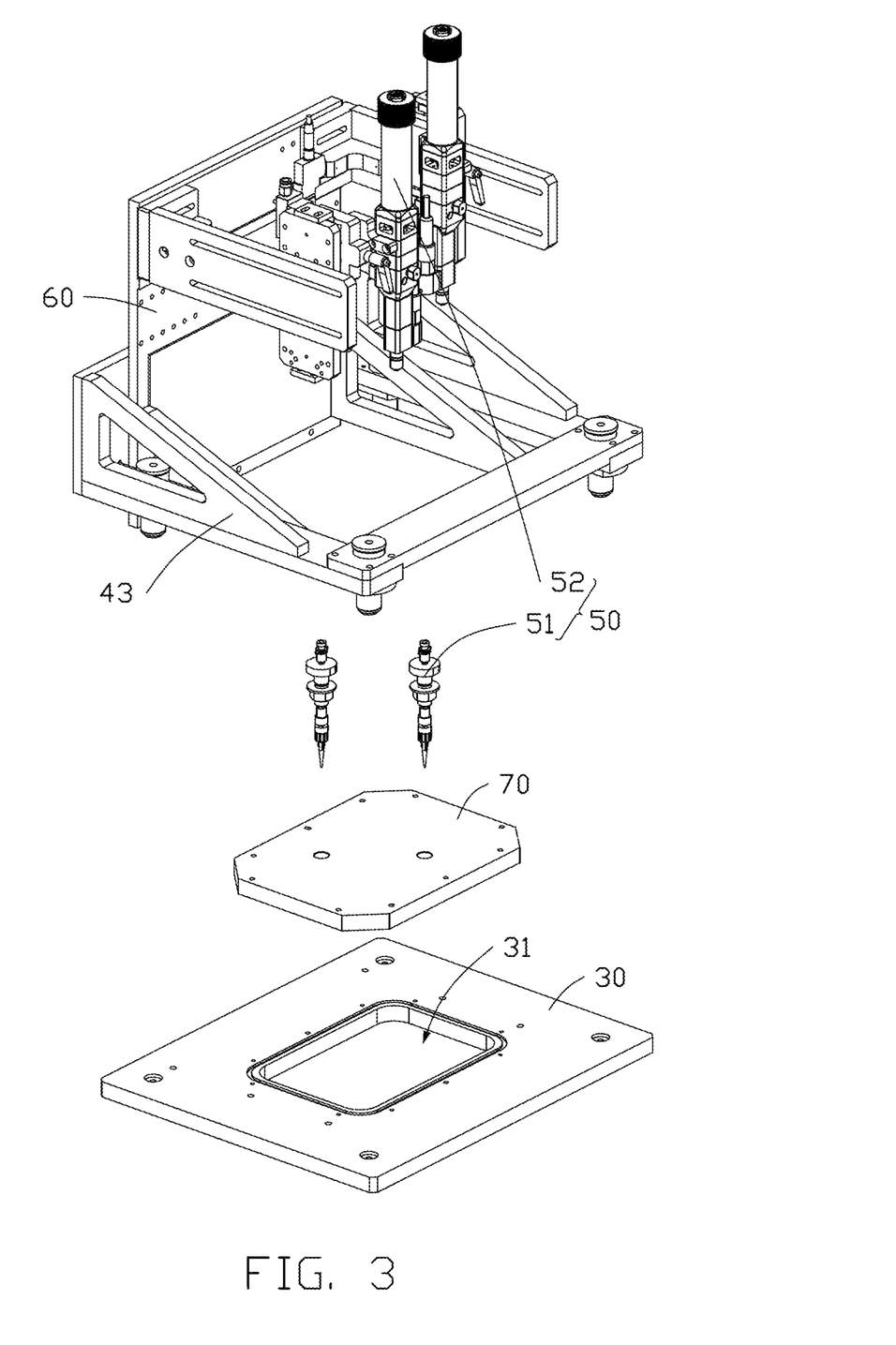
FIG. 3 is a partial exploded view of the liquid introduction apparatus in FIG. 1 showing a frame, a cover, a carrier, an introduction mechanism, a fixing plate and other structures.

Referring to FIG. 1, FIG. 2 and FIG. 3, the cabinet 20 is configured for receiving the product 400, the cover 30 is configured for covering the cabinet 20 to cooperate with the cabinet 20 to form a sealed space 20a, and the cover 30 defines a through hole 31. The cover transfer mechanism 40 is adjacent to the cabinet 20 and is connected to the cover 30, and the cover transfer mechanism 40 is configured to move the cover 30 to seal the cabinet 20. The introduction mechanism 50 includes an introduction nozzle 51 connected to the cover transfer mechanism 40, the introduction nozzle 51 extends through the through hole 31 of the cover 30 and is configured for connecting to the product 400 in the cabinet 20 when the cover 30 is moved to seal the cabinet 20 by the cover transfer mechanism 40, the introduction nozzle 51 begins to dispense liquid into the product 400 when the sealed space 20a has a vacuum environment.

Referring to FIG. 1, FIG. 2 and FIG. 3, according to some embodiments, the cabinet 20 has a first opening 21 for connecting with an air extracting apparatus (not shown) and a second opening 22. The cover 30 can be moved by the cover transfer mechanism 40 to cover the second opening 22 to define the sealed space 20a, and can be moved away from the second opening 22 by the cover transfer mechanism 40. When the cover 30 covers the second opening 22 and the sealed space 20a is defined, the air extracting apparatus can discharge air from the sealed space 20a.

In the liquid introduction apparatus 200 according to the embodiment, the product 400 is placed in the cabinet 20, the cover transfer mechanism 40 moves the cover 30 to cover the second opening 22 of the cabinet 20 for defining the sealed space 20a, and the introduction nozzle 51 is moved together with the cover 30 and is connected to the product 400 when the sealed space 20a is defined. Then the air extracting apparatus discharges air from the sealed space 20a to until the sealed space 20a has a vacuum environment.

Accordingly, the process of the introducing liquid from introduction nozzle 51 into the product 400 can be performed in the sealed space 20a having a vacuum environment. After performing the liquid introduction process, the cover transfer mechanism 40 moves the cover 30 to expose the second opening 22, with the introduction nozzle 51 detached from the product 400, the vacuum environment is broken and the product 4 in the cabinet 20 is at atmospheric pressure. After that, the product 400 can be taken away from the cabinet 20. The operations can be completed in series for introducing liquid into the product 400.

Since the sealed space 20a has a vacuum environment before injecting the liquid into the product 400, a space of the product 400 in the sealed space 20a for storing the liquid also has a vacuum environment and the liquid introduction process is performed in a vacuum environment, which eliminates influence of air or air flow affecting the flow or introduction of the liquid, the liquid can flow smoothly in the product 400 at a higher speed in the vacuum environment than that in a non-vacuum environment. In addition, the vacuum environment helps to avoid generating bubbles in the liquid, the liquid can be filled more uniformly in the products 400, which is beneficial to eliminate defects such as poor filling saturation or insufficient compactness after the liquid is cured in the products 400, so that the yield rate of the production can be improved. Furthermore, the cabinet 20 receives only the product 400, both the introduction mechanism 50 and the cover transfer mechanism 40 are located outside the cabinet 20, therefore, the cabinet 20 does not require a large volume, which reduces working load and working hours of the air extracting apparatus, and improves the efficiency of the introduction of the liquid.

Referring to FIG. 2, according to further embodiments, the first opening 21 is positioned at a bottom of the cabinet 20. It should be noted that, the first opening 21 can be positioned at any side of the cabinet 20.

According to this embodiment, the cover transfer mechanism 40 may be a two-axis linear device, a three-axis linear device, a robot, or any other device capable of moving the cover 30 and the introduction nozzle 51 of the introduction mechanism 50.

Referring to FIG. 1 and FIG. 3, according to some embodiments, the liquid introduction apparatus 200 may further include a carrier 60, the carrier 60 is connected between the introduction mechanism 50 and the cover 30, so that the introduction mechanism 50 and the cover 30 can be moved together by the cover transfer mechanism 40. The carrier 60 provides a stable connection between the introduction mechanism 50 and the cover 30, and the position of the cover 30 relative to the introduction mechanism 50 does not change when the cover 30 and the introduction mechanism 50 are moved by the cover transfer mechanism 40.

According to some embodiments, the introduction mechanism 50 may further include a reservoir 52 mounted on the carrier 60 for storing the liquid. The introduction nozzle 51 is connected to reservoir 52 for introducing liquid from the reservoir 52 into the product 400. The reservoir 52 can store two or more types of liquid, or a liquid mixture, broadening the applicable range of the liquid introduction apparatus 200. In this embodiment, the reservoir 52 and the cover 30 may be located at the same side of the carrier 60.

Referring to FIG. 1 and FIG. 3, according to some embodiments, the cover transfer mechanism 40 may include a first driving assembly 41, a second driving assembly 42, and a frame 43. The first driving assembly 41 is mounted on the platform 10 for moving the second driving assembly 42 and the frame 43 along a first direction, the second driving assembly 42 is arranged on the first driving assembly 41 and configured for moving the frame 43 along a second direction, the second direction and the first direction are different. The cover 30 is mounted to the frame 43, and the cover 30 can be moved together with the frame 43. The first direction is perpendicular to the second direction. Therefore, the cover transfer mechanism 40 can move the cover 30 and the introduction mechanism 50 in two different directions, which facilitates the movement of the cover 30 for sealing the cabinet 20. Furthermore, since both the carrier 60 and the frame 43 are connected to the cover 30, and when the frame 43 is moved, the cover 30, the carrier 60, and the introduction mechanism 50 will be moved together, and the relative positions of the cover 30 and the introduction mechanism 50 are unchanged during moving. In this embodiment, as shown in FIG. 1, the first direction may be shown as X-axis direction, and the second direction may be shown as Z-axis direction.

Referring to FIG. 3, according to some embodiments, the liquid introduction apparatus 200 may further include a fixing plate 70 arranged on the cover 30. The fixing plate 70 covers the through hole 31, and the introduction nozzle 51 is extended through and secured in the fixing plate 70 at a portion of the fixing plate 70 right above the through hole 31, for further extension through the through hole 31. The fixing plate 70 covers the through hole 31 and provides a fixing position for the introduction nozzle 51, which can increase the sealing efficacy of the cover 30 and the cabinet 20.

It should be noted that, the fixing plate 70 may be omitted in at least one embodiment, the introduction nozzle 51 extends through the cover 30 and is adaptably secured in the cover 30.

Referring to FIG. 1, according to some embodiments, the liquid introduction apparatus 200 may further include a cabinet transfer mechanism 80 mounted on the platform 10. The cabinet transfer mechanism 80 is connected to the cabinet 20 and is configured for moving the cabinet 20 in a third direction, the third direction is different from the first direction and the second direction. Therefore, by a cooperation of the cover transfer mechanism 40 and the cabinet transfer mechanism 80, the product 400 in the cabinet 20 and the introduction nozzle 51 can be aligned or repositioned relative to each other for subsequent connection therebetween. In this embodiment, the third direction is perpendicular to the first direction and the second direction, the third direction is Y-axis direction shown in FIG. 1. In further embodiments, the third direction can be any other direction different from Y-axis direction, which is not limited here.

According to some embodiments, the cabinet transfer mechanism 80 may be a linear module. It should be noted that, the cabinet transfer mechanism 80 may be a linear cylinder, a telescopic rod, or any other device capable of reciprocating linear movement.

According to further embodiments, the cover transfer mechanism 40 may include only the second driving assembly 42 for moving the cover 30 together with the introduction nozzle 51 in Z-axis direction, and the cabinet transfer mechanism 80 may include two driving assemblies for moving the cabinet 20 in X-axis direction and Y-axis direction respectively, then the introduction nozzle 51 and the product 400 in the cabinet 20 can be positioned relative to each other and be connected. It should be noted that, in further embodiments, the cover transfer mechanism 40 may be configured for moving the introduction nozzle 51 in any one or two directions of X-axis direction, Y-axis direction, and Z-axis direction, and the cabinet transfer mechanism 80 may be configured for moving the cabinet 20 in the other direction(s), which is not limited here.

Referring to FIG. 2, according to some embodiments, the liquid introduction apparatus 200 may further include a sealing element 90 and a sealing groove 23 surrounding the second opening 22 defined in the cabinet 20. The sealing groove 23 is configured for receiving the sealing element 90, the sealing groove 23 cooperates with the sealing element 90 to seal a gap between the cover 30 and the cabinet 20 and reinforce the sealing of the sealed space 20a. In this embodiment, the sealing element may be made of rubber materials.

According to some embodiments, the liquid introduction apparatus 200 may further include a sensor 25 for detecting air pressure in the sealed space 20a. Therefore, the air pressure in the sealed space 20a can be monitored, and the air extracting apparatus can be shut down right after the vacuum in the sealed space 20a meets a preset value, to prevent the vacuum in the sealed space 20a from being too negative and prevent a deformation of the cabinet 20.

Referring to FIG. 2, according to some embodiments, the liquid introduction apparatus 200 may further include a first valve 100 and a second valve 110. The first valve 100 is connected between the first opening 21 and the air extraction device and is configured for permitting or denying a communication between the air extracting apparatus and the first opening 21. The second valve 110 is connected between the first opening 21 and is configured for permitting or denying a communication between the first opening 21 and external atmosphere. When the second valve 110 is switched on, the vacuum environment of the sealed space 20a is broken to allow the cover 30 to be easily moved from the cabinet 20 in vacuum-breaking environment, and the degree of vacuum in the sealed space 20a can be regulate slowly to prevent the liquid in the product 400 from being expelled due to a rapid change in air pressure. In this embodiment, each of the first valve 100 and the second valve 110 may be a solenoid valve or any other device having an on-off function.

It should be noted that, in further embodiments, a further opening is defined in the cabinet 20 for connecting to the second valve 110.

Referring to FIG. 2, according to further embodiments, the cabinet 20 may have a window 24, an operative can observe a current situation of the product 400 and the introduction nozzle 51 in the sealed space 20a via the window 24, ensuring that the introduction nozzle 51 performs the liquid introduction process only when the introduction nozzle 51 is correctly connected to the product 400, which avoids overflow of the liquid onto outer surface of the product 400. The window is made of light transmitting materials, such as glass or acrylic.

In operation, the product 400 is placed in the cabinet 20, then the cover transfer mechanism 40 and the cabinet transfer mechanism 80 cooperate to move the cabinet 20 and the cover 30 for sealing the cabinet 20 by the cover 30 to define the sealed space 20a, and the introduction nozzle 51 is connected to the product 400 at the same time. Then the operative can observe the current situation of the product 400 and the introduction nozzle 51 to ensure that the introduction nozzle 51 is accurately connected to the product 400. After that, the air extracting apparatus extracts air from the sealed space 20a, when the sensor 25 detects that the air pressure in the sealed space 20 has reached the preset value, the first valve 100 will be closed and the air extracting apparatus can be shut down. Then the product 400 is in the vacuum environment and the introduction mechanism 50 can introduce liquid into the product 400 through the introduction nozzle 51. After the liquid introduction, the second valve 110 enables the communication between the first opening 21 and the external atmosphere, the vacuum sealed space 20a is regulated to slowly reach atmospheric pressure. Then the cover transfer mechanism 40 moves the cover 30 together with the introduction mechanism 50 away from the cabinet 20, and the product 400 can be taken away from the cabinet 20. The process of introducing liquid into the product is thus completed.

Therefore, the liquid introduction apparatus 200 operates by cooperation of the platform 10, the cabinet 20, the cover 30, the cover transfer mechanism 40, the introduction mechanism 50, and other mechanisms. The cover transfer mechanism 40 and the cabinet transfer mechanism 80 cooperate to seal the cabinet 20 and connect the introduction nozzle 51 to the product 400, the air extracting apparatus extracts air from the sealed space 20a to form a vacuum environment for the product 400, including a vacuum interior space of the product 400, then the introduction mechanism 50 can introduce liquid into the product 400 in the vacuum environment. The vacuum environment eliminates influences of air movement affecting the flow or introduction of the liquid, the liquid can flow smoothly in the product 400 at a higher speed in a vacuum environment than that in a non-vacuum environment, the efficiency of introduction and the production efficiency of the products 400 are improved.

Furthermore, the cabinet 20 receives only the product 400, the introduction mechanism 50 and the cover transfer mechanism 40 are both located outside the cabinet 20, therefore, the cabinet 20 does not require a large volume, which reduces working load and working hours of the air extracting apparatus, and improves the efficiency of the introduction of the liquid.

The air pressure in the inner space 20a can be monitored and regulated by the sensor 25, the first valve 100, and the second valve 110. The sensor 25 monitors the air pressure in the sealed space 20a to control the first valve 100 and the second valve 110, for controlling the air pressure in the sealed space 20a. The first valve 100 can be controlled to discharge air from the sealed space 20a, the second valve 1120 can be controlled to regulate the sealed space 20a to reach the atmospheric pressure slowly, avoiding the liquid introduced into the product 400 being expelled by a rapid changing in air pressure. The operative can observe the situation of the introduction nozzle 51 and the product 400 through the window 24 to ensure that the introduction nozzle 51 is connected to the product 400 accurately.

Figure 4:
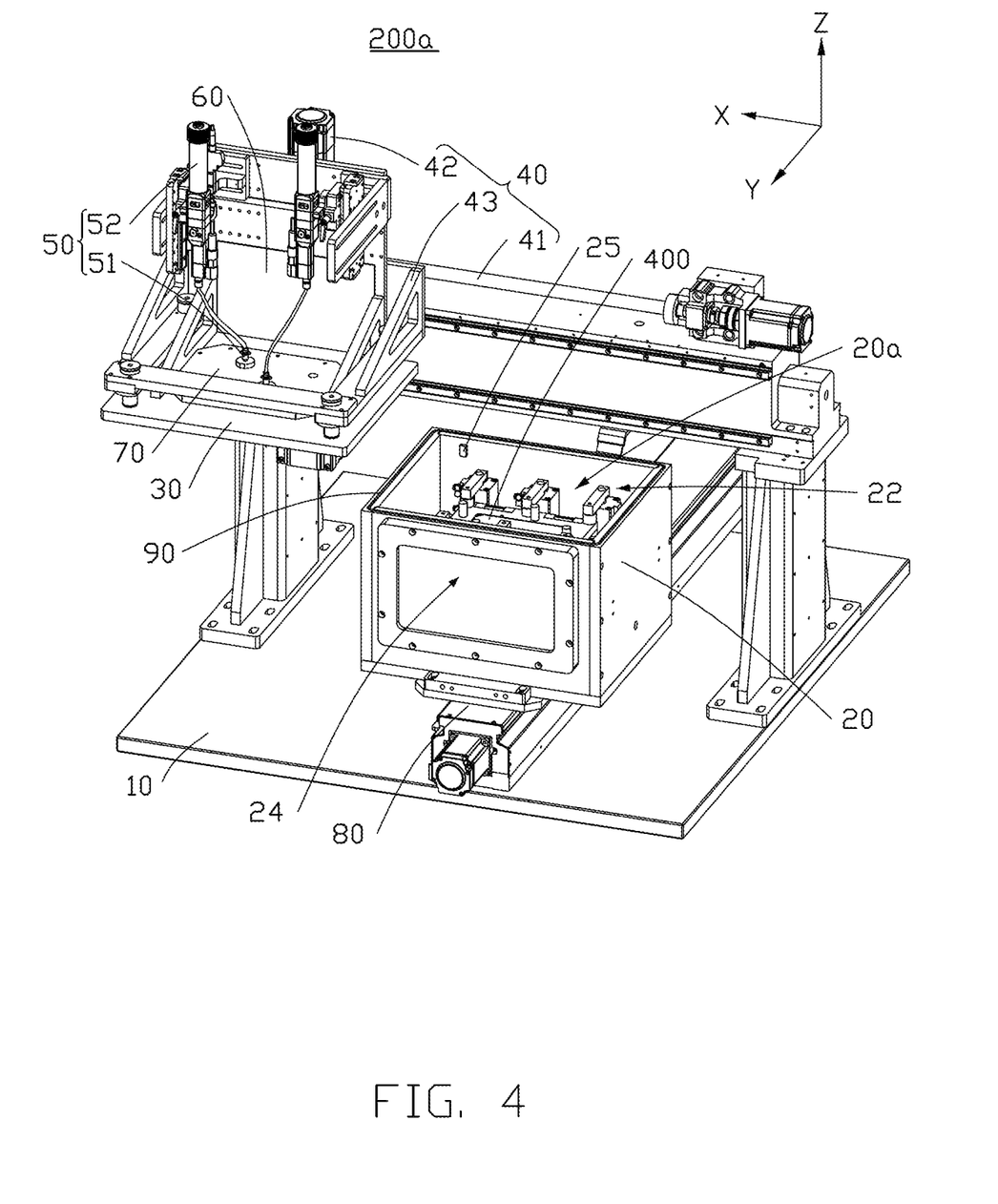
FIG. 4 is a perspective view of a liquid introduction apparatus according to a second embodiment of the present disclosure.

Referring to FIG. 4, a liquid introduction apparatus 200a according to a second embodiment of the application is disclosed. The configuration of the liquid introduction apparatus 200a of the second embodiment is same as that of the first embodiment, except that the liquid introduction apparatus 200a further includes a jacking assembly 120. The jacking assembly 120 is arranged in the cabinet 20, and the jacking assembly 120 is configured for lifting the product 400 in the third direction for connecting the product 400 to the introduction nozzle 51. It should be noted that, the product 400 in the second embodiment may have a larger size than that of the product 400 in the first embodiment. That is, the liquid introduction apparatus 200 is suitable for processing products 400 of a smaller size, and the liquid introduction apparatus 200a is suitable for processing products 400 which are larger. It should be noted that this is not a limitation of the application.

According to further embodiments, the jacking assembly 120 is arranged on the platform 10. The jacking assembly 120 is configured for lifting the cabinet 20 and the product 400 in the cabinet 20. It should be noted that, in this embodiment, the cover transfer mechanism 40 is configured for moving the introduction nozzle 51 in X-axis direction and Y-axis, the cabinet transfer mechanism 80 is omitted, the cover transfer mechanism 40 cooperates with the jacking assembly 120 to position the product 400 relative to the introduction nozzle 51. It should be noted that, in further embodiments, the jacking assembly 120 is connected to the cabinet transfer mechanism, and the cover transfer mechanism moves the introduction nozzle 51 in X-axis direction, then the product 400 can be positioned relative to the introduction nozzle 51 by cooperation of the cover transfer mechanism 40, the cabinet transfer mechanism, and the jacking assembly 120.

Figure 5:
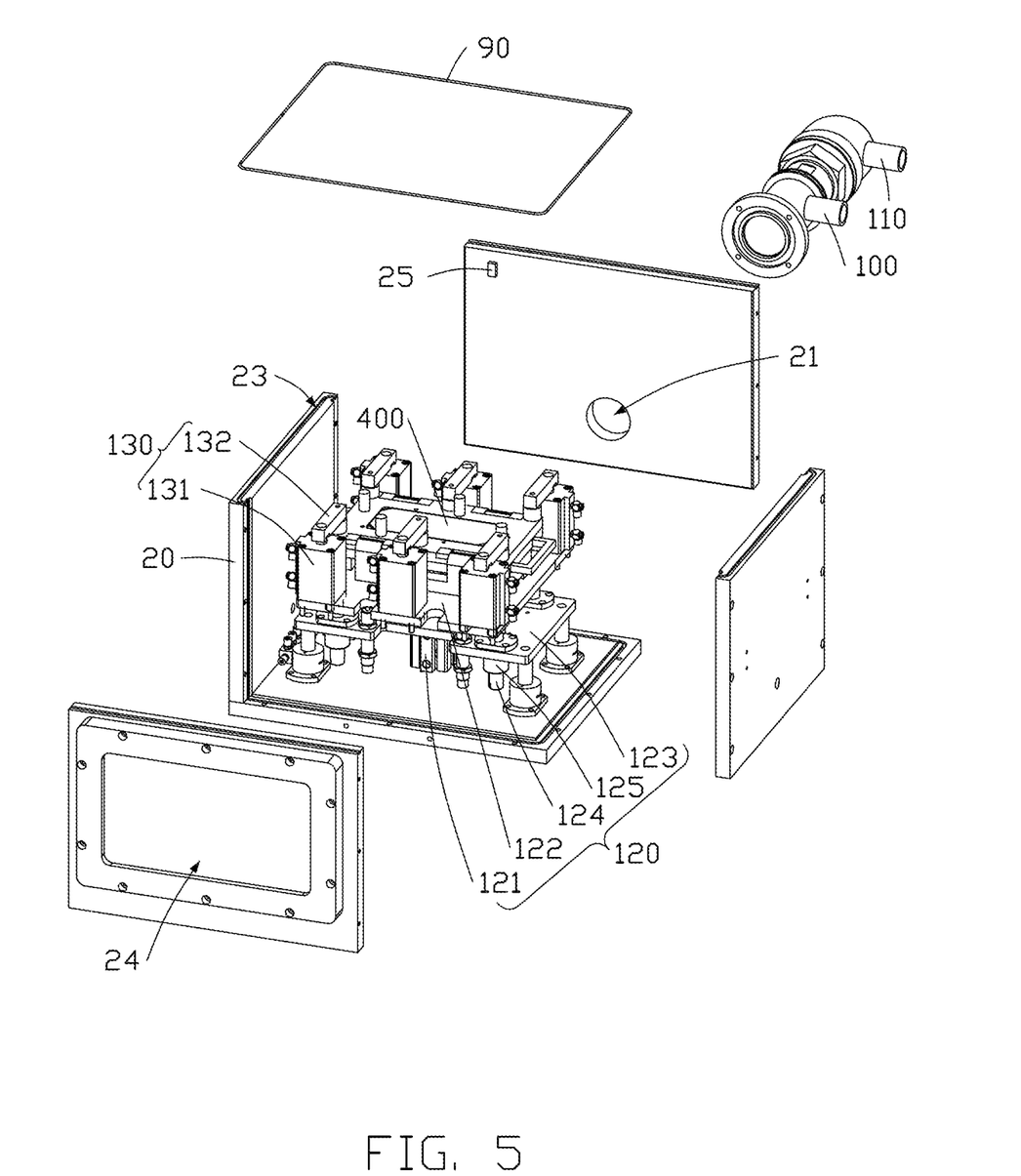
FIG. 5 is an exploded view of a cabinet, a jacking assembly, and a pressing assembly of the liquid introduction apparatus in FIG. 4.

Referring to FIG. 5, according to some embodiments, the first opening 21 is defined in a side face of the cabinet 20.

Referring to FIG. 5, according to some embodiments, the jacking assembly 120 is arranged in the cabinet 20 for lifting the product 400 in the cabinet 20, and the jacking assembly 120 includes a jacking driver 121 and a jacking member 122. The jacking driver 121 is arranged on a bottom of the cabinet 20, and the jacking member 122 is configured for supporting the product 400, and the jacking driver 121 is configured for lifting the jacking member 122 to lift the product 400 relative to the introduction nozzle 51, thus effecting the connection between the product 400 and the introduction nozzle 51. In this embodiment, the jacking driver 121 may be a linear cylinder, a telescopic rod, or any other member capable of reciprocating linear movement.

According to some embodiments, the jacking assembly 120 may further includes a carrier plate 123, a guiding rod 124, and a guiding sleeve 125. The carrier plate 123 is positioned below the jacking member 122 for supporting the jacking member 122. The guiding sleeve 125 is sleeved on the guiding rod 124 for moving longitudinally along the guiding rod 124, the guiding rod 124 is fixed to the bottom of the cabinet 20 at one end and is extended into the guiding sleeve 125 at the other end, the guiding sleeve 125 is fixed to the carrier plate 123 at one end and sleeved on the guiding rod 124 at the other end. Thus, the carrier plate 123 moves longitudinally along the guiding rod 124 and the guiding sleeve 125. In this embodiment, the jacking driver 121 goes through the carrier plate 123 to connect with the jacking member 122 for lifting the jacking member 122, when the jacking member 122 moves, the carrier plate 123 will move together with the jacking member 122. With guidance from the guiding sleeve 125 and the guiding rod 124, direction of the jacking member's 122 movement is limited to the longitudinal direction of the guiding rod 124 and the guiding sleeve 125, which enhances accuracy of the jacking member's 122 movement. In this embodiment, the carrier plate 123 may be a substantially rectangular plate, each corner of the rectangular plate is supported by one guiding sleeve 125 and one guiding rod 124, providing stable support and stable movement of the carrier plate 123. In further embodiments, according to actual requirement, the carrier plate 123 may have other shape, and the jacking assembly 120 may be provided with more than one guiding sleeve 125 and guiding rod 124.

Referring to FIG. 5, according to some embodiments, the liquid introduction apparatus 200a may further include a pressing assembly 130. The pressing assembly 130 includes a pressing driver 131 and a pressing member 132. The pressing driver 131 is arranged on the jacking member 122 and surrounds the product 400, the pressing member 132 is connected to the pressing driver 131 for being driven to secure the product 400 on the jacking member 122, avoiding rocking or displacement of the product 400 during lifting. In this embodiment, the jacking driver 121 may be a rotary lifting cylinder, the liquid introduction apparatus 200a may be provided with multiple pressing assemblies 130, and the multiple pressing assemblies 130 would surround the product 400 for securing the product 400 on the jacking member 132.

According to this embodiment, in operation, the product 400 is placed on the jacking member 132, then the pressing driver 131 drives the pressing member 132 to press the product 400 against the jacking member 132 for securing the product 400. After that, the cover 30 seals the cabinet 20, the jacking driver 121 lifts the jacking member 122 to bring the product 400 to the introduction nozzle 51.

It should be noted that, the pressing assembly 130 or the jacking assembly 120 may be omitted. For example, in further embodiments, the product 400 can be fixed on the jacking member 122 directly. The cabinet transfer mechanism can move the product 400 in Y-axis direction and Z-axis direction.

Figure 6:
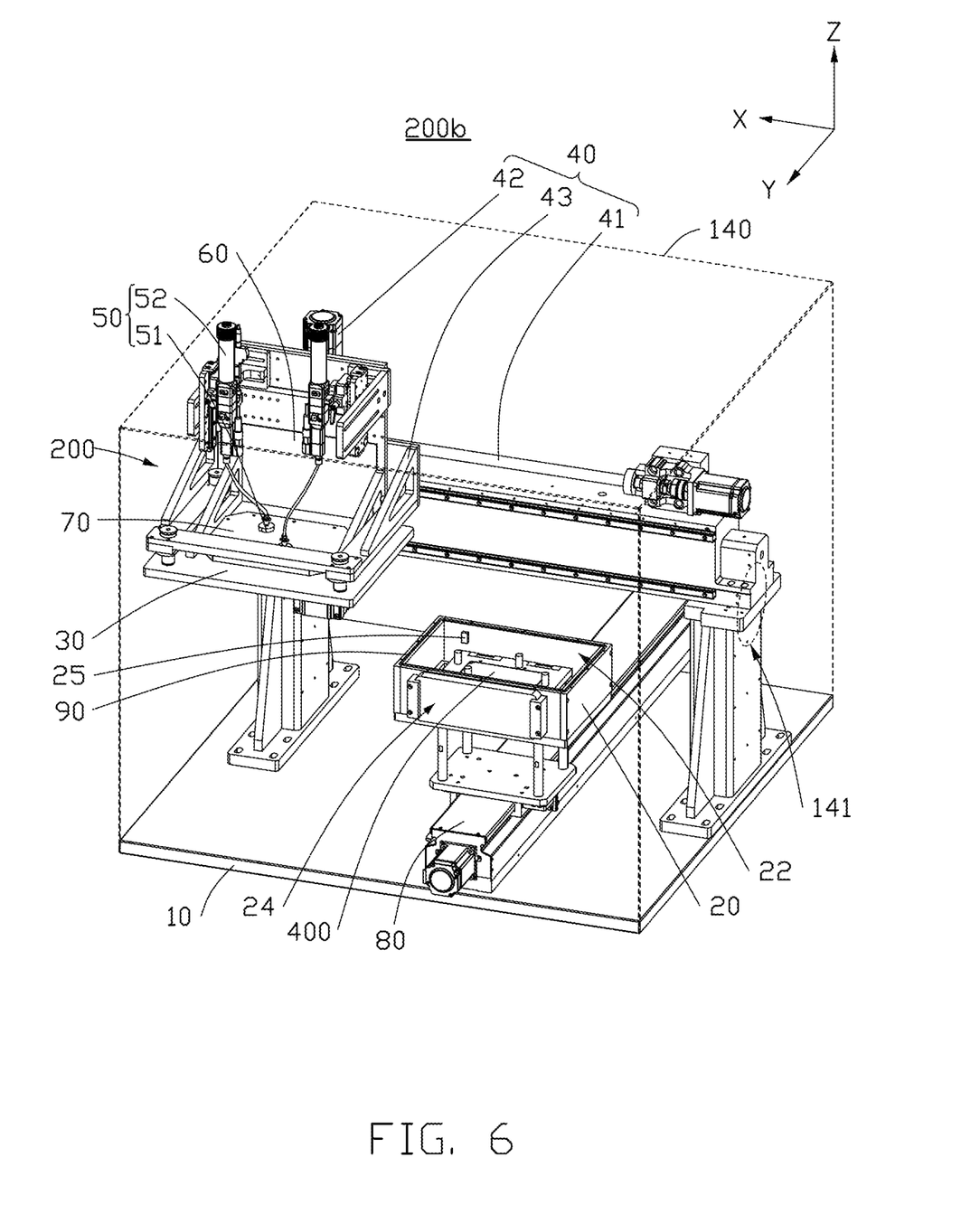
FIG. 6 is a perspective view of a liquid introduction apparatus according to a third embodiment of the present disclosure.

Referring to FIG. 6, a liquid introduction apparatus 200b according to a third embodiment of the application is provided. The configuration of the liquid introduction apparatus 200a of the second embodiment is same as that of the first embodiment, except that the liquid introduction apparatus 200b further includes a housing 140. The housing 140 is arranged on the platform 10, and the housing 140 is configured for receiving the cabinet 20, the cover transfer mechanism 40, the cover 30, the introduction mechanism 50, and other structures. The housing 140 is defined with a notch 141 for connecting to an air extracting device. The housing 140 cooperates with the platform 10 to define an inner space, the inner space can be evacuated through the botch 141 by the air extracting device, then the introduction mechanism 50 can operate in a vacuum environment. The vacuum environment eliminates influence of air or air flow affecting the flow or introduction of the liquid, the liquid can flow into the product 400 at a higher speed in the vacuum environment than that in a non-vacuum environment, thus the efficiency of introduction and the production efficiency of the products 400 can be improved. Furthermore, the vacuum environment helps to avoid generating bubbles in the liquid, the liquid can be filled more uniformly in the products 400, which is beneficial to eliminate defects such as poor filling saturation or insufficient compactness after the liquid is cured in the products 400, so that the yield rate of the production can be improved.

It should be noted that, according to further embodiment, a vacuum-breaking port is defined in the housing 140 for breaking the vacuum in the housing 140 and regulating the housing 140 to subsequently reach atmospheric pressure slowly. The vacuum breaking port may further be used for placing the product 400 into the cabinet 20 and/or picking the product 400 from the housing 140.

It should be noted that, the housing 140 can be fixed on the platform 10 or moveable arranged on the platform 10, for example, in further embodiments, a transfer mechanism, such as a robot, is used for moving the housing 140 to the platform 10 to define the inner space inside, in a way similar to the cover transfer mechanism 40 moving the cover 30, not being limited.

Figure 7:
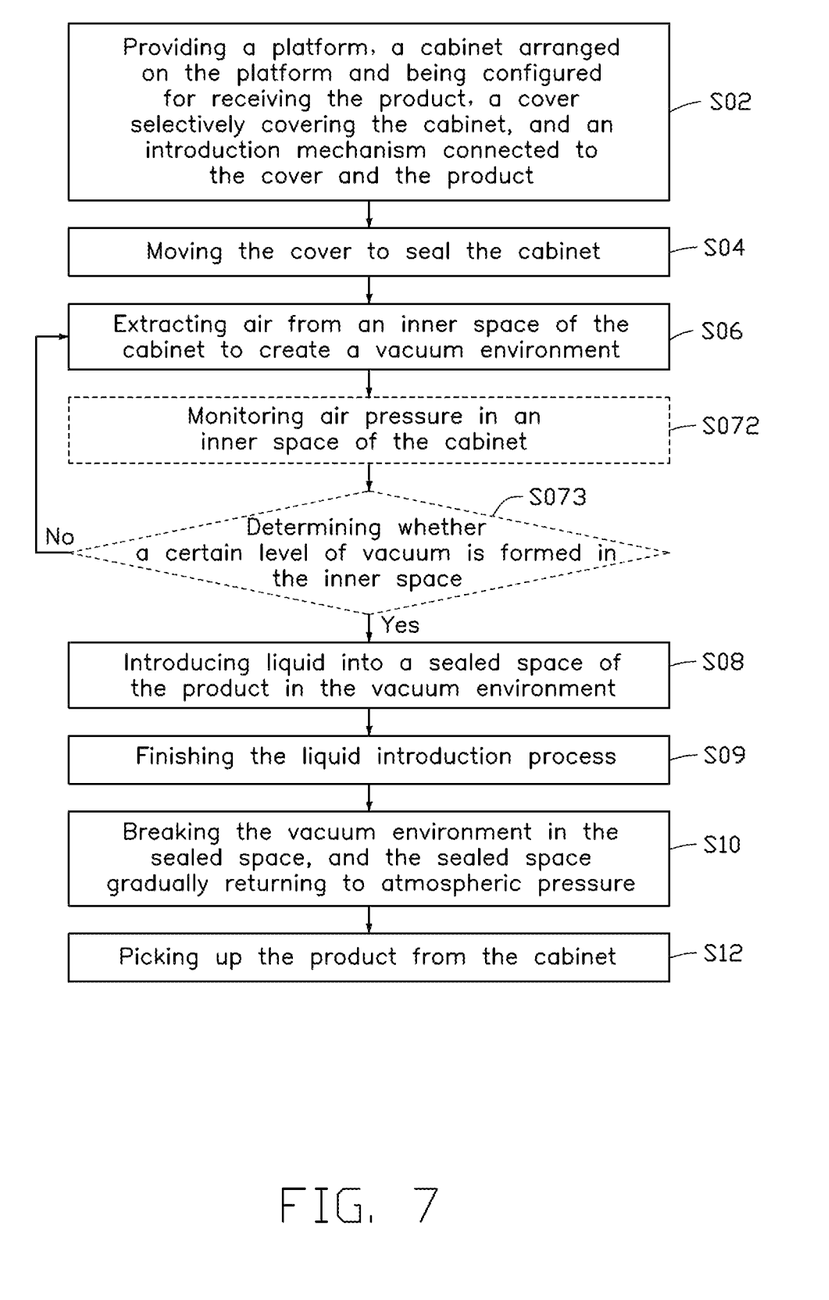
FIG. 7 is a flow chart showing a liquid introduction method of the present disclosure.

Referring to FIG. 7, a liquid introduction method is provided, the liquid introduction method is used for introducing liquid into a product 400, and the liquid introduction method is performed by the liquid introduction apparatus above-mentioned. According to actual requirements, some steps in the method can be skipped or be performed in different order. For the purposes of description, only steps relating to the embodiments of the application are shown. The liquid introduction method includes steps S02-S08.

Step S02: providing a platform, a cabinet arranged on the platform and configured for receiving the product, a cover selectively covering the cabinet, and an introduction mechanism connected to the cover and the product 400.

Step S04: moving the cover to seal the cabinet.

It should be noted that, in this embodiment, the cabinet 20 is sealed by the cover, in further embodiments, the cabinet 20 can self-seal, and in that case, the Step S04 may be omitted.

Specifically, a sealed space 20a is defined by the cabinet 20 and the cover 30. The product 400 can be placed in the cabinet 20 and taken away from the cabinet 20 through the second opening 22, and the cover transfer mechanism 40 may be a two-axis linear device, a three-axis linear device, a robot, or any other device capable of moving the cover 30.

Step S06: discharging air from a sealed space 20a of the cabinet 20 to create a vacuum environment.

In this embodiment, the step is performed by connecting the first opening 21 to an air extracting apparatus.

Specifically, a first valve 100 is connected between the first opening 21 and the air extraction device, the first valve 100 is configured for controlling open or closed a communication between the air extracting apparatus and the first opening 21.

Step S08: introducing liquid into an inner space of the product 400 in the vacuum environment.

Specifically, an introduction nozzle 51 of an introduction mechanism 50 is used for introducing liquid into the product 400 in the vacuum environment. The vacuum environment eliminates influence of air or air flow affecting the flow or introduction of the liquid, the liquid can flow into the product 400 at a higher speed in the vacuum environment than that in a non-vacuum environment, thus the efficiency of introduction and the production efficiency of the products 400 are improved. Furthermore, the vacuum environment helps to avoid generating bubbles in the liquid, the liquid can be uniformly filled more uniformly in the product 400, which is beneficial to eliminate defects such as poor filling saturation or insufficient compactness after the liquid is cured in the products 400, so that the yield rate of the production can be improved.

Referring to FIG. 7, according to some embodiment, the liquid introduction method further includes steps S09-S12.

Step S09: finishing the liquid introduction process.

Specifically, in this step, the interior space of the product 400 is sensed to determine whether the interior space is filled. For example, the completeness of liquid filling in the product 400 can be determined according to pressure or amount of the liquid introduced into the product 400 in step S06, or time length of the liquid introduction. This may also be done by some sensors (such as photoelectric sensors), or a combination of any one or more factors above. When the interior space of the product 400 is filled, the liquid introduction can be stopped.

Step S10: breaking the vacuum environment in the sealed space 20a, and gradually returning the sealed space 20a to atmospheric pressure.

Specifically, the vacuum environment in the sealed space 20a can be broken by removing the cover 30, or by using a valve to establish a communication between the sealed space 20a and external environment, then the sealed space 20a gradually returns to atmospheric pressure.

Step S12: picking up the product 400 from the cabinet 20.

According to some embodiments, the step S06 includes step S062.

Step S062: extracting air from the sealed space 20a by the air extracting apparatus device to form a vacuum environment.

Referring to FIG. 7, according to some embodiments, the liquid introduction method further includes steps S072-S074, performed between S06 and S08.

Step S072: monitoring air pressure in the sealed space 20a.

Specifically, a sensor 25 is configured for monitoring air pressure in the sealed space 20a.

Step S073: performing introducing liquid into the product in the vacuum environment when the air pressure in the sealed space is equal to a preset value.

Specifically, the sensor 25 detects air pressure in the sealed space 20a, a controller compares the air pressure in the sealed space 20a to a preset value. The preset value indicates an air pressure suitable for performing liquid introduction process to the product 400 in the sealed space 20a. When the air pressure in the sealed space 20a reaches the preset value, the step S06 will be performed; when the air pressure in the sealed space 20a doesn't reach the preset value, the step S04 will be performed.

The liquid introduction method provides the cabinet 20 for receiving the product 400, sealing the cabinet 20 to define the sealed space 20a, extracting air from the sealed space 20a and inner space of the product 400, which eliminates influence of air or air flow affecting the flow or introduction of the liquid, the liquid can flow smoothly in the product 400 at a higher speed in the vacuum environment than that in a non-vacuum environment. In addition, the vacuum environment helps to avoid generating bubbles in the liquid, the liquid can be filled more uniformly in the products 400, which is beneficial to eliminate defects such as poor filling saturation or insufficient compactness after the liquid is cured in the products 400, so that the yield rate of the production can be improved. Furthermore, the cabinet 20 receives only the product 400, the introduction mechanism 50 and the cover transfer mechanism 40 are both located outside the cabinet 20, therefore, the cabinet 20 is not required to be of a large volume, which reduces working load and working hours of the air extracting apparatus, and improves the efficiency of the introduction of the liquid.

While the invention has been described in detail with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments.

What is claimed is:

1. A liquid introduction apparatus configured for introducing liquid into a product, the liquid introduction apparatus comprising:
   a platform;
   a cabinet arranged on the platform, the cabinet being configured for receiving the product;
   a cover selectively covering the cabinet, the cover defining a through hole;
   a cover transfer mechanism arranged on the platform and adjacent to the cabinet, the cover transfer mechanism being connected to the cover and is configured to move the cover to seal the cabinet;

an introduction mechanism comprising an introduction nozzle connected to the cover transfer mechanism, the introduction nozzle extending through the through hole of the cover, the introduction nozzle being for connecting to the product in the cabinet and introducing liquid into the product when the cabinet has a vacuum environment; and the cover transfer mechanism comprising a first driving assembly positioned on the platform, a second driving assembly connected to the first driving assembly, and a frame connected to the second driving assembly and the cover, wherein the first driving assembly is configured to drive the second driving assembly to move in a first direction, and the second driving assembly is configured to drive the frame to move in a second direction.

2. The liquid introduction apparatus of claim 1, further comprising a carrier, wherein the carrier is connected between the introduction mechanism and the cover, the introduction mechanism comprises a reservoir mounted on the carrier, the reservoir is configured for storing the liquid, the introduction nozzle is connected to the reservoir for introducing the liquid from the reservoir to the product, and the reservoir and the cover are located at the same side of the carrier.

3. The liquid introduction device of claim 1, further comprising:

a cabinet transfer mechanism on the platform, wherein the cabinet transfer mechanism is connected to the cabinet, the cabinet transfer mechanism is configured for moving the cabinet in a movement direction, and the movement direction is different from the first direction and the second direction.

4. The liquid introduction apparatus of claim 1, wherein a first side of the cabinet defines a first opening for discharging air from the cabinet, and a second side of the cabinet defines a second opening, and the cover selectively covers the second opening for sealing the cabinet.

5. The liquid introduction apparatus of claim 1, further comprising:

a jacking assembly arranged in the cabinet, the jacking assembly comprising:

a jacking driver arranged on a bottom of the cabinet; and a jacking member connected to the jacking driver and configured for supporting the product;

wherein the jacking driver is configured to drive the jacking member and the product to move together to the introduction nozzle.

6. The liquid introduction apparatus of claim 1, wherein the liquid introduction apparatus further comprises a sensor, wherein the sensor is configured for detecting air pressure in a sealed space defined by the cabinet cooperating with the cover to confirm whether to discharge air from the sealed space.

7. The liquid introduction apparatus of claim 1, further comprising a housing arranged on the platform, wherein the housing defines a notch configured for connecting to an air extracting device, and the housing receives the cabinet, the cover transfer mechanism, the cover, and the introduction mechanism.

8. The liquid introduction apparatus of claim 4, further comprising a first valve connected to the first opening of the cabinet, wherein the first valve is configured for allowing or preventing the air in the cabinet from being extracted; and a second valve connected to the first opening of the cabinet, wherein the second valve is configured for controlling communication between the first opening of the cabinet and external atmosphere.

9. An adhesive dispensing apparatus comprising:

a platform;

a cabinet arranged on the platform and configured for receiving a product;

a cover selectively covering the cabinet;

a cover transfer mechanism arranged on the platform and adjacent to the cabinet, the cover transfer mechanism being connected to the cover and selectively seal the cabinet by the cover;

an adhesive dispensing mechanism comprising an introduction nozzle connected to the cover transfer mechanism, the introduction nozzle extending through the cover, the introduction nozzle being for connecting to the product in the cabinet and introducing glue into the product when the cabinet has a vacuum environment; and the cover transfer mechanism comprising a first driving assembly positioned on the platform, a second driving assembly connected to the first driving assembly, and a frame connected to the second driving assembly and the cover, wherein the first driving assembly is configured to drive the second driving assembly to move in a first direction, and the second driving assembly is configured to drive the frame to move in a second direction.

10. The adhesive dispensing apparatus of claim 9, further comprising a carrier, wherein the carrier is connected between the adhesive dispensing mechanism and the cover, the adhesive dispensing mechanism comprises a reservoir mounted on the carrier, the reservoir is configured for storing the glue, the introduction nozzle is connected to the reservoir for introducing the glue from the reservoir to the product, and the reservoir and the cover are located at the same side of the carrier.

11. The adhesive dispensing apparatus of claim 9, further comprising:

a cabinet transfer mechanism on the platform, wherein the cabinet transfer mechanism is connected to the cabinet and configured for moving the cabinet in a movement direction, the movement direction is different from the first direction and the second direction.

12. The adhesive dispensing apparatus of claim 9, wherein a first side of the cabinet defines a first opening for discharging air from the cabinet, and a second side of the cabinet defines a second opening, and the cover selectively covers the second opening for sealing the cabinet.

13. The adhesive dispensing apparatus of claim 9, further comprising:

a jacking assembly arranged in the cabinet, the jacking assembly comprises:

a jacking driver arranged on a bottom of the cabinet; and a jacking member connected to the jacking driver and configured for supporting the product;

wherein the jacking driver is configured to drive the jacking member and the product to move together to the introduction nozzle.

14. The adhesive dispensing apparatus of claim 9, wherein the adhesive dispensing apparatus further comprises a sensor, the sensor is configured for detecting air pressure in a sealed space defined by the cabinet cooperating with the cover to confirm whether to discharge air from the sealed space.

15. The adhesive dispensing apparatus of claim 9, wherein the cabinet comprises a window configured to observe a current situation of the product and the introduction nozzle in the cabinet.

* * * * *